United States Patent [19]

Rudd, III

[11] 4,349,830

[45] Sep. 14, 1982

[54] CONICAL NOZZLE FOR AN ELECTROSTATIC INK JET PRINTER

[75] Inventor: Robert E. Rudd, III, Danbury, Conn.

[73] Assignee: Burroughs Corporation, Detroit, Mich.

[21] Appl. No.: 206,012

[22] Filed: Nov. 12, 1980

[51] Int. Cl.$^3$ .............................................. G01D 15/18

[52] U.S. Cl. .................................... 346/140 R; 346/75

[58] Field of Search .............................. 346/140 R, 75

[56] References Cited

U.S. PATENT DOCUMENTS 3,848,258 11/1974 Mahoney .......................... 346/75 X
3,886,565 5/1975 Kosima ............................... 346/140
3,887,928 6/1975 Ohono ................................ 346/140
3,996,883 12/1976 Gusarov ................................. 118/8

FOREIGN PATENT DOCUMENTS 2041831 9/1980 United Kingdom .

*Primary Examiner*—Joseph W. Hartary
*Attorney, Agent, or Firm*—Mark T. Starr; Kevin R. Peterson; Edmund M. Chung

[57] ABSTRACT

An improved ink jet nozzle for an electrostatic printer comprising a fine pipe for feeding ink therethrough onto a separately positioned piece of paper under the control of an electric field, the end of the pipe nearest the paper having a conical configuration which provides shortened tube length for increased ink flow and reduced nozzle diameter for improved frequency response.

17 Claims, 4 Drawing Figures

CONICAL NOZZLE FOR AN ELECTROSTATIC INK JET PRINTER

BACKGROUND OF THE INVENTION

A. Field of the Invention

The invention relates generally to an ink jet printer and, more particularly, to an improved ink jet nozzle configuration for an electrostatic ink jet printer.

B. Description of the Prior Art

Previous jet nozzles consisted of hypodermic tubing cut by an oblique plane at an angle somewhere between 0° and 90° with the tube centerline. Ink would flow through the tube from the reservoir and rest on the cut at the opposite end. This ink was held in place by surface tension causing an ellipsoidally shaped meniscus to form. The application of an electric potential to the jet/ink combination caused an electric field to be formed. At some critical value of electric field or voltage a cone of ink formed. Thereafter an ink filament is created from the point of the cone. The ink flow is modulated by variations of the electric field which is switched from one value to another. The frequency of the switching of the ink flow is limited by the time taken to form and extinguish this cone. It is this limitation which determined the frequency response of a particular configuration.

BRIEF DESCRIPTION OF THE INVENTION

A. Objects of the Invention

Accordingly, it is an object of the present invention to provide a new and improved nozzle for an electrostatic ink jet printer.

It is another object of this invention to provide an improved nozzle for an electrostatic ink jet printer which provides increased frequency response.

It is yet another object of this invention to provide an improved nozzle for an electrostatic ink jet printer which produces better quality printed patterns.

It is also an object of this invention to provide an improved nozzle for an electrostatic ink jet printer whose unique configuration is in the shape of a cone.

B. Summary of the Invention

In summary, improved results are achieved by a novel conically shaped nozzle for an ink jet printer. One of the advantages of such a conically shaped nozzle is that it allows shorter effective length. In its present configuration the nozzle's effective length corresponds to the thickness of the metal from which the cone is formed. For example, this could be as thin as 0.002" which would still allow for some strength in the cone. Prior art tube lengths have been on the order of 0.070". Thus, the ratio of improvement is approximately 35 to 1. One obvious benefit of this reduced tube length is increased ink flow due to the reduction in viscous drag.

Another benefit of the present cone shaped jet nozzle is that it allows the use of an angle first proposed by Sir Geoffrey Taylor, F.R.S. in his article "Disintegration of Water Drops in an Electric Field", published in the *Proceedings of the Royal Society, London, Series A, Volume A*280, pp. 383–397 (1964). Taylor's model suggests that a conductive fluid in equilibrium with an electric field will form a cone prior to forming a filament or jet, and it has been further shown that the semi-vertical angle of this cone is 49.3° irrespective of the fluid involved. Very precise control of the electric field is needed in order to maintain a cone of fluid without forming a jet and yet a cone must form before a jet will occur. The conical nozzle is an aid in holding the fluid to the conical shape.

Further, the proposed cone shaped nozzle allows the use of a smaller diameter hole. That is, due to the increase in ink flow previously mentioned as being accomplished by the length reduction, the diameter of the nozzle opening may be reduced. This, in turn provides a desirable decrease in the time taken by the fluid to respond to a change in the electric potential applied to the nozzle.

BRIEF DESCRIPTION OF THE DRAWINGS

The foregoing objects and summary, as well as various other objects, features and attendant advantages of the present invention will be more fully appreciated as the same becomes better understood from the following detailed description of the present invention when considered in connection with the accompanying drawings, in which.

DETAILED DESCRIPTION OF THE INVENTION

Figure 1:
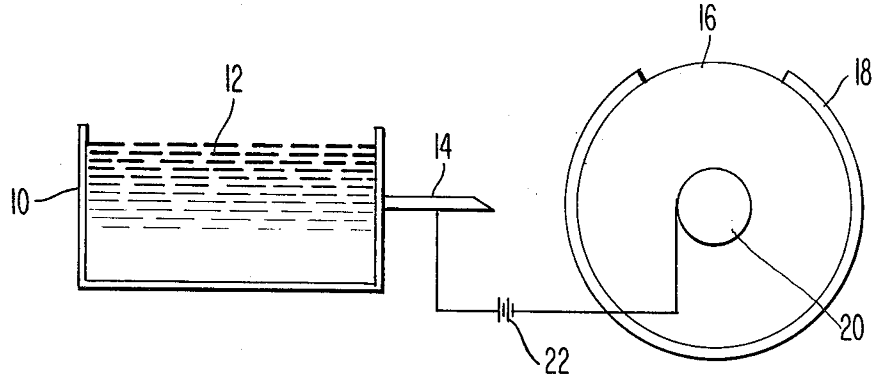
FIG. 1 illustrates the basic electrostatic ink jet system in which both the prior art ink jet nozzle as well as the present novel ink jet nozzle will be utilized.

The following detailed description will be more easily comprehended when it is read with reference to the foregoing drawings in which like reference numerals denote corresponding parts.

FIG. 1 illustrates a pictorial diagram of a basic electrostatic ink jet system. An ink supply 12 is housed in an ink supply container 10. Mounted on the container 10 is an ink jet nozzle 14. A platen 16 has mounted thereon a sheet of paper 18. The platen 16 further includes a conductive connecting means 20. Between this connecting means 20 and the nozzle 14 is connected a voltage source 22. The application of this potential 22 between the nozzle 14 and the platen 16 creates an electric field. At some critical level of electric field, a cone of ink is formed at the tip of the nozzle 14. Thereafter an ink filament is formed which flows between the nozzle 14 and the surface of the paper 18. The ink flow is initiated or interrupted (modulated) by varying the level of potential supply 22.

Figure 2:
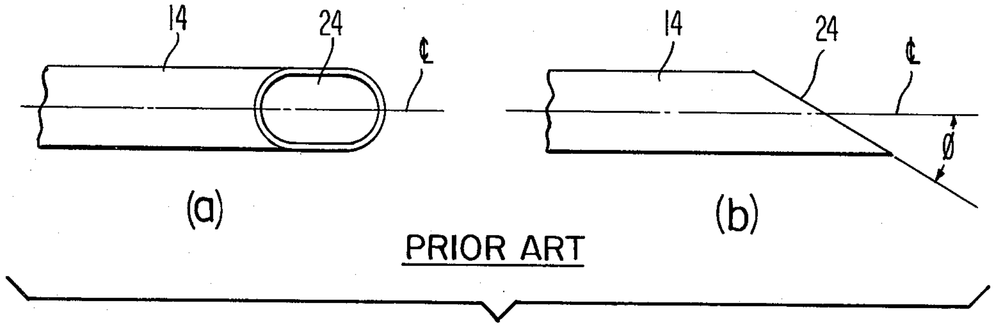
FIG. 2 includes FIGS. 2A and 2B and taken together they illustrate the detailed configuration of the prior art ink jet nozzle.

In prior art systems, this jet nozzle 14 was most often shaped as illustrated in FIGS. 2A and 2B. It was usually created from a piece of hypodermic tubing whose end was cut by an oblique plane 24 at an angle $\phi$. This angle was somewhere between 0° and 90° from the centerline (C/L). Ink will flow through the tube 14 from the reservoir and rest on the cut plane 24 at the opposite end of the tube 14. This ink 12 is held in place by surface tension along the cut plane 24 causing an ellipsoidally shaped meniscus to form.

The application of a critical potential 22 will cause a cone to form at this plane 24. The frequency response of the system is limited by the time that is required to create and terminate this cone.

Figure 4:
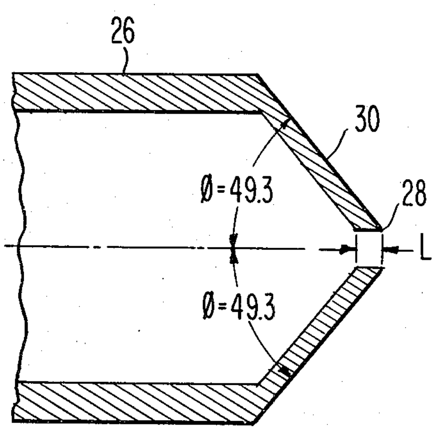
FIG. 4 is a cross section of FIG. 3 taken at the points shown.
Figure 3:
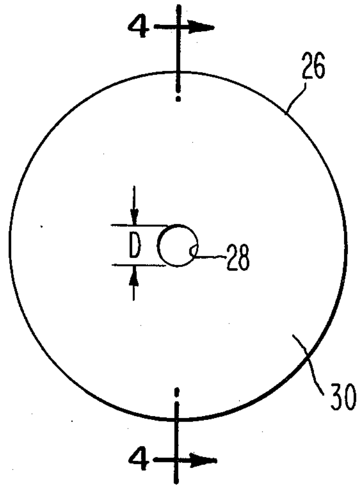
FIG. 3 is a detailed configuration of the end view of the proposed new ink jet nozzle of the present invention.

In the ink jet nozzle 26 illustrated pictorially in FIGS. 3 and 4 the improved configuration is depicted. FIG. 4 is a cross section of the end view illustrated in FIG. 3.

As previously discussed, a filament of liquid is only observed at the tip of the cone. Therefore, the response time of an electrostatic ink jet will be in part determined by how closely the fluid is held to a conical shape of 49.3° (semi-vertical angle) or less. More specifically, the time taken by the fluid with its inherent mass under the action of the available electrostatic force to move from the static meniscus shape to the necessary jet-forming conical shape will determine the response time of an electrostatic ink jet nozzle. It follows that such a nozzle 26 should have a conical shape with a hole 28 at the tip, and that the semi-vertical angle of the cone should be 49.3°. It further follows that the response time will be dependent on the diameter of the hole and that decreasing the hole size will decrease the response time which is an object of this invention.

Viscous forces increase rapidly with diminished hole size and this may reduce the amount of ink which an ink jet can deliver. The mass flow can be maintained, however, by such means as simultaneously increasing the electrostatic force, altering the electrical properties of the fluid, reducing the fluid viscosity, or by shortening the length of the nozzle. The conical nozzle described herein can be hollow with a thin wall 30 which minimizes the viscous drag in the hole 28 and allows both high optical density writing and large written line widths. Small response times can thereby be achieved with a small hole diameter while necessary line width and density can be maintained.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

What is claimed is:

1. An electrostatic ink jet system comprising:

ink supply means for containing a supply of ink;

an ink jet nozzle mounted on said ink supply means, said ink jet nozzle including a fine pipe having a longitudinal channel for feeding said ink therethrough into a separately positioned piece of paper under control of an electric field, the end of said pipe nearest the paper having a conical configuration, the portion of said pipe adjacent to said conical configuration having a tubular configuration, an oriface passing through the tip of the conical configuration, the wall of said oriface being parallel with the axis of said longitudinal channel, the diameter of the longitudinal channel increasing between the tip of said conical configuration and the end of said tubular configuration adjacent to said conical configuration, the inner surface of said conical configuration forming an angle of approximately 49.3° with the axis of said longitudinal channel;

said piece of paper mounted on a conductive platen; and wherein said electric field is applied between said platen and said ink jet nozzle.

2. The electrostatic ink jet system in accordance with claim 1 wherein the oriface is centered at the vertex of said conical configuration.

3. The electrostatic ink jet system in accordance with claim 1 wherein the diameter of the longitudinal channel in said tubular configuration is substantially constant.

4. The electrostatic ink jet system in accordance with claim 1 wherein the tip of said conical configuration is cut away along a perpendicular plane with respect to the longitudinal axis of said channel, said conical configuration further being cut away beginning at the intersection of said perpendicular plane with the outer surface of said conical configuration and extending longitudinally through the walls of said conical configuration along a plane parallel with the longitudinal axis of said channel.

5. The electrostatic ink jet nozzle in accordance with claim 1 wherein the outer surface of said conical configuration forms an angle of approximately 49.3° with the axis of said longitudinal channel.

6. The electrostatic ink jet system in accordance with claim 1 wherein the oriface has a diameter of approximately 0.004 inch.

7. The electrostatic ink jet system in accordance with claim 1 wherein said ink jet nozzle is made of metal.

8. The electrostatic ink jet system in accordance with claim 1 wherein the wall of said conical configuration has a thickness of approximately 0.002 inch.

9. The electrostatic ink jet system in accordance with claim 1 wherein the end of the tubular configuration which is not adjacent to the conical configuration is mounted to said ink supply means.

10. An electrostatic ink jet system comprising:

ink supply means for containing a supply of ink;

an ink jet nozzle mounted on said ink supply means, said ink jet nozzle including a fine pipe having a longitudinal channel for feeding said ink therethrough onto a separately positioned piece of paper under control of an electric field, the end of said pipe nearest the paper having a conical configuration, the portion of said pipe adjacent to said conical configuration having a tubular configuration, an oriface passing through the tip of the conical configuration, the wall of said oriface being parallel with the axis of said longitudinal channel, the diameter of the longitudinal channel increasing between the tip of said conical configuration and the end of said tubular configuration adjacent to said conical configuration, the outer surface of said conical configuration forming an angle of approximately 49.3° with the axis of said longitudinal channel;

said piece of paper mounted on a conductive platen; and wherein said electric field is applied between said platen and said ink jet nozzle.

11. The electrostatic ink jet system in accordance with claim 10 wherein the oriface is centered at the vertex of said conical configuration.

12. The electrostatic ink jet system in accordance with claim 10 wherein the diameter of the longitudinal channel in said tubular configuration is substantially constant.

13. The electrostatic ink jet system in accordance with claim 10 wherein the tip of said conical configuration is cut away along a perpendicular plane with respect to the longitudinal axis of said channel, said conical configuration further being cut away beginning at the intersection of said perpendicular plane with the outer surface of said conical configuration and extending longitudinally through the walls of said conical configuration along a plane parallel with the longitudinal axis of said channel.

14. The electrostatic ink jet system in accordance with claim 10 wherein the oriface has a diameter of approximately 0.004 inch.

15. The electrostatic ink jet system in accordance with claim 10 wherein said ink jet nozzle is made of metal.

16. The electrostatic ink jet system in accordance with claim 10 wherein the wall of said conical configuration has a thickness of approximately 0.002 inch.

17. The electrostatic ink jet system in accordance with claim 10 wherein the end of the tubular configuration which is not adjacent to the conical configuration is mounted to said ink supply means.

* * * * *

UNITED STATES PATENT AND TRADEMARK OFFICE
CERTIFICATE OF CORRECTION

PATENT NO. : 4,349,830

DATED : September 14, 1982

INVENTOR(S) : Robert E. Rudd, III

It is certified that error appears in the above-identified patent and that said Letters Patent are hereby corrected as shown below:

In claim 1, at column 3, line 47, change "into" to --onto--.

Signed and Sealed this

*Twenty-third* Day of *November 1982*

[SEAL]

*Attest:*

GERALD J. MOSSINGHOFF

*Attesting Officer* *Commissioner of Patents and Trademarks*